Patented Aug. 27, 1935

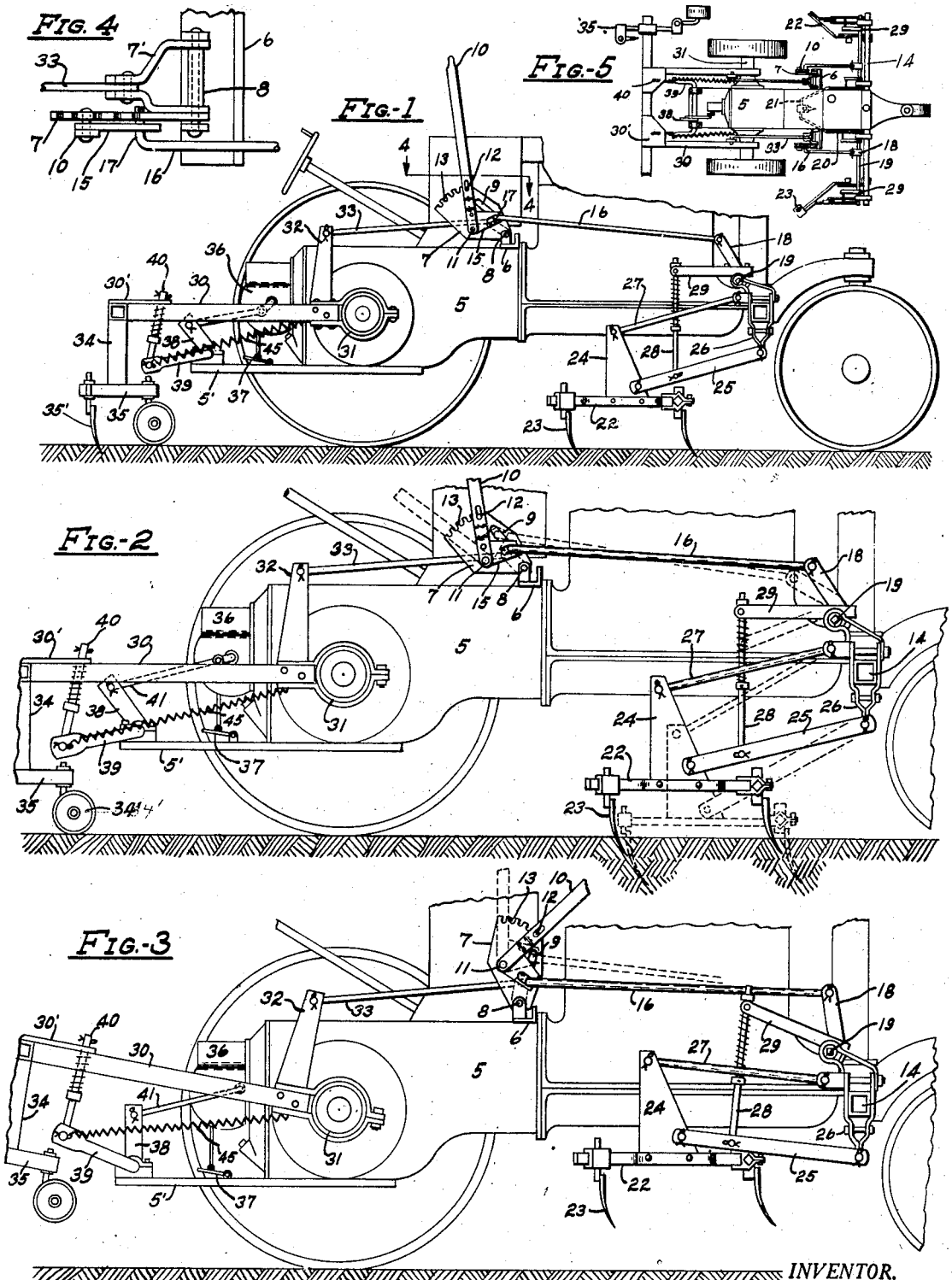

2,012,853

UNITED STATES PATENT OFFICE 2,012,853

TRACTOR-CULTIVATOR

Daniel C. Heitshu, Racine, Wis., assignor to J. I. Case Company, Racine, Wis., a corporation Application January 10, 1934, Serial No. 706,025

2 Claims. (Cl. 97—47)

In the operation of a tractor cultivator of the character disclosed in the Geraldson Patent No. 1,879,181 it becomes necessary to adjust the shovels to penetrate the earth at varying degrees of depth according to conditions, and also to raise the shovels a considerable distance so that they will be clear from contact with the earth and therefore inoperable, and it is my object to provide means under control of the tractor operator whereby the shovels of the forward cultivator equipment may be lowered to maximum and less depths and at all times raised to utmost extent irrespective of their depth, in a simple and expeditious manner, and simultaneously with such adjustment the rear cultivator equipment may be brought into normal cultivating and non-working positions, as will hereinafter appear.

In the accompanying drawing, forming part hereof, Figure 1 is a side elevation of a tractor-cultivator embodying my improvements; Fig. 2, an enlarged side elevation showing different positions of the linkage system and associated parts, the forward shovels being indicated by full and dotted lines in minimum and maximum positions in relation to the earth; Fig. 3, a side elevation showing the relation of the linkage parts when adjusted to raise and maintain the forward shovels at extreme height; Fig. 4, a detail section taken on the dotted line 4—4 in Fig. 1, and Fig. 5 is a diagrammatic view of the implement.

In carrying out my invention I employ two sets of linkage systems and actuating parts, one at each side of a tractor 5, and as such equipments are similar a description of one of the sets will be sufficient. Upon a frame part 6 of the tractor a quadrant plate 7 is pivotally mounted, at 8, Fig. 1, said quadrant having a slot 9 therein and to which quadrant a lever 10 is pivotally secured, at 11, and is provided with the usual detent 12 for engagement in notches 13 in the quadrant for locking the lever in the position desired. To the lever 10 an adjusting plate 15 is fixedly secured by welding or otherwise, and which has an opening therethrough registering with the slot 9 in the quadrant. A link 16 having a bent end 17 is inserted through the opening in the adjusting plate 15 and the slot 9 and extends forwardly and is pivotally connected to an arm 18 mounted on a rock shaft 19 for adjusting the sets of the front cultivator gangs, there being preferably two at each side of the tractor body, the inner gangs 20 (the side shovels not shown) lying at each side of the body and mounted on a single frame 21, Fig. 5, and which gangs are closely adjacent the body, the outer gangs 22 having shovels 23 being supported at the outer ends of the supporting frame bars 14 by plates or similar members 24 connected by a pair of links 25 to brackets 26 secured to said frame, and which members at their upper ends are also connected to said brackets 26 by links 27 positioned in parallel relation to the links 25, to which latter links tension-rods 28 are secured, the upper ends of the rods being connected to arms 29 secured to the rock-shafts 19.

Rearwardly extending beams 30 are pivotally secured to the axle housings 31, each of which beams carries an arm 32 connected by a link 33 to quadrant frame 7', Fig. 4, which is securely fastened to quadrant 7 and moves therewith, and which beam supports a frame 34 carrying rear gangs 35 on which latter gauge wheels 34' are mounted. The tractor 5 embodies a power lift 36 of any conventional type including a treadle 37, which lift is connected to a lever 38 secured to a crank-shaft 39, which latter in turn is connected to a plate 30' on the beam 30 by a tension-rod 40, said lever and power-lift being connected by the link 41.

In Fig. 1 the linkage systems and the front gangs are shown as having been so adjusted, by tripping the power-lift to rotate a half turn, as to thrust the shovels 23 but slightly into the earth, that is, at minimum depth, the rear shovels 35' which follow the path of the tractor drive wheels being shown in normal working condition. As deeper penetration of the front shovels at each side of the tractor becomes desirable it is but necessary to throw levers 10 rearwardly, as indicated by dotted lines in Fig. 2, when the linkage systems described, through the pulling action of said levers, will thrust the shovels 23 to the maximum depth indicated in dotted lines, Fig. 2, and if required to adjust the shovels to depths intermediate those shown in Fig. 2 such varied penetrations may be readily accomplished by throwing levers 10 forwardly to be engaged in a notch in the quadrant between the notches of its opposite ends, whereby the forward gangs may be locked in predetermined depths as desired. When leaving a row to turn into the next row or otherwise, it is desired to raise the front and rear gangs from working position, which is accomplished by tripping the treadle 37 so that the power-lift will make a half turn, which rotation, through link 41, lever 38, crank-arm 39 and rod 40, assisted by springs 45, raises beams 30 and parts associated therewith, the arms 32 at the same time forcing links 33 forwardly to throw quadrants 7 into the position indicated in Fig. 3, causing the slots 9 to assume substantially vertical position and urge links 16 forwardly to rock shafts 19 by the arms 18, which movements actuate arms 29, the links 25, 27, and associated parts, to raise the front cultivator gangs to maximum position as indicated in Fig. 3. It will be understood that for each front gang 22 there are two of the draft links 25, to insure rigidity of the gangs; and regardless of their depth of penetration, as when adjusted by lever 10 operating link 16 in slot 9, shown in Fig. 2, said gangs can always be raised to the maximum height as shown in Fig. 3 irrespective of the setting of link 16 in said slot, for the reason that the slot is tangent to the pivotal pin connecting arm 18 and rod or link 16. This maximum lift is at all times desirable so that when turning the cultivator the shovels 23 will not collect trash or damage crops at the ends of the rows. When the cultivator gangs are thus in raised position, Fig. 3, the linkage and associated parts will so remain irrespective of any manipulation of the levers 10, as the quadrants remain stationary, and the only results from movement of the levers will be the raising and lowering of links 16 idly through the vertical slots 9, thereby making it possible to set shovels 23, by the levers 10, to any depths of cultivation desired, and upon tripping the power lift said shovels will always be raised to the same maximum height, so that when turning or traveling on the road or otherwise the cultivators remain in elevated position. When resuming operation, however, it is but necessary to trip the power-lift in the manner described when the shovels will enter the earth, Fig. 1, and the front shovels may then be adjusted to and maintained at the desired depth by manipulating the levers in the manner explained. It will be further understood that the rear shovels 35' are entirely controlled by the gauge-wheels 34', which shovels follow the movements of the wheels over ground irregularities, and that said gauge-wheels also control the depth of the entire cultivation as they establish the relative position of the quadrant to the gangs when actuating the quadrant through the beams 30, arms 32 and links 33. This is of advantage as, when the rear tractor wheel enters a depression, the depth of cultivating by both front and rear gangs is maintained at a predetermined level. By this arrangement the wheels 34' will gauge the depth of the entire cultivating without the multiplicity of gauge wheels usually mounted on the individual front gangs when independently gauged. Furthermore, the front gang adjustment can be changed readily with my improved construction, whereas with individual gauge wheels on the front gangs, so far as I am aware, such wheels must be manually adjusted to obtain the working depth of the shovels.

I claim as my invention:

1. The combination, with a tractor including a power lift, of cultivating mechanism pivotally mounted on the forward part of the tractor, cultivating mechanism pivotally mounted on the rear of the tractor, a quadrant having an opening therein and pivotally mounted on the tractor, a lever pivotally mounted on the quadrant, a link movable in said quadrant opening and connecting the forward cultivating mechanism to the lever, a link connecting the rear cultivating mechanism to the quadrant, a crank-shaft on the rear of the tractor having a lever secured thereto, resilient means connecting the shaft to the rear cultivating mechanism, a link connecting the power lift to said lever for rocking the shaft to raise and lower said latter mechanism, and means for controlling the power lift to actuate said links to raise and lower the cultivator mechanisms simultaneously so that when in lowered position the lever may be actuated to vary the working depth of the forward cultivating mechanism independently of the rear cultivating mechanism.

2. The combination, with a tractor including a power lift, of a support on the forward end of the tractor, a rock-shaft on the support, a cultivator gang-supporting frame, parallel links connecting said frame to said support, an arm on the rock-shaft, a quadrant having a slot therein and pivotally connected to the tractor, a combined lever and adjusting plate pivotally connected to the quadrant, a link connected at one end to said arm and having its opposite end passing through the adjusting plate and the slot in the quadrant; a cultivator gang frame including shovels disposed rearwardly of the tractor and pivotally connected thereto, gauge wheels associated with the rear gang frame for controlling the depth of penetration of the shovels on said gang frame, a link connecting the quadrant and rear gang, a crank-shaft on the tractor having a lever secured thereto, resilient means connecting the shaft to the rear gang frame, a link connecting the power lift to said lever for rocking the shaft to raise and lower said latter frame, and means for controlling the power lift to alternately actuate the first mentioned link to raise and lower the rear gang and simultaneously with said adjustment to raise and lower the front cultivating gangs.

DANIEL C. HEITSHU.